US008950120B2

(12) United States Patent
Gielda et al.

(10) Patent No.: US 8,950,120 B2
(45) Date of Patent: Feb. 10, 2015

(54) LATCH LOAD DISTRIBUTION SYSTEM

(75) Inventors: Matthew James Gielda, Peoria, IL (US); Derick Lee Hinderliter, Mapleton, IL (US); Rajesh Mishra, Dunlap, IL (US); Thomas Allan Jenne, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 13/597,528

(22) Filed: Aug. 29, 2012

(65) Prior Publication Data
US 2014/0059936 A1 Mar. 6, 2014

(51) Int. Cl.
*B60J 5/04* (2006.01)
(52) U.S. Cl.
USPC .................................. 49/502; 49/503; 49/394
(58) Field of Classification Search
CPC ........ B60J 5/0487; B60J 5/0419; B60J 5/062; B62D 33/0617; E02F 9/163
USPC ............ 49/394, 502, 503; 296/146.1, 190.01, 296/190.06, 190.11; 180/89.12
See application file for complete search history.

(56) References Cited

U.S. PATENT DOCUMENTS

| 5,095,659 | A | | 3/1992 | Benoit et al. |
| 5,286,073 | A | * | 2/1994 | Ui .................................. 292/216 |
| 5,655,798 | A | * | 8/1997 | Kaveney et al. .................. 292/3 |
| 6,611,990 | B1 | * | 9/2003 | Sogo et al. ..................... 16/87 R |
| 7,614,117 | B2 | * | 11/2009 | Selvaraj ........................... 16/258 |
| 7,677,648 | B2 | * | 3/2010 | Bell et al. ................. 296/190.11 |
| 7,695,055 | B2 | * | 4/2010 | Tsukamoto ............. 296/190.11 |
| 7,975,349 | B2 | | 7/2011 | Broadhead et al. |
| 2008/0093883 | A1 | * | 4/2008 | Shibata et al. ............. 296/146.9 |
| 2010/0052358 | A1 | * | 3/2010 | Kinoshita et al. .......... 296/146.1 |
| 2010/0108336 | A1 | | 5/2010 | Thomson et al. |
| 2011/0181074 | A1 | * | 7/2011 | Namura et al. .......... 296/190.01 |
| 2011/0185637 | A1 | * | 8/2011 | Uto et al. ........................ 49/399 |
| 2012/0248813 | A1 | * | 10/2012 | Nakamura et al. ......... 296/146.5 |

* cited by examiner

*Primary Examiner* — Katherine Mitchell
*Assistant Examiner* — Abe Massad
(74) *Attorney, Agent, or Firm* — Miller, Matthias & Hull

(57) ABSTRACT

A latch load distribution system and method for assembling such for a vehicle are disclosed. The latch load distribution system may comprise a window, a door, a latch bracket and a door handle. The door may include a window and a door frame surrounding the window. The door frame may include an inner panel and an outer panel joined to the inner panel. The outer panel may define a cavity having an inner sidewall and a mouth with a mount width. The latch bracket may have a latch bracket length, and may include a primary end, a body and a secondary end. The primary end may be disposed in the cavity and may be coupled to the outer panel. The door handle may be coupled to the door frame and the latch bracket.

19 Claims, 5 Drawing Sheets

LATCH LOAD DISTRIBUTION SYSTEM

TECHNICAL FIELD

The present disclosure generally relates to door latch systems and, more particularly, relates to latches mounted on doors having a reduced cross-sectional door area, particularly those used on vehicles used in earth moving, construction, material handling, mining applications, and the like.

BACKGROUND

Latch apparatus on vehicle doors are known. Such apparatus typically are mounted with to a door frame that surrounds and supports a window. Loads on the apparatus may be transmitted to the door and, in some cases, the loads may be high enough to deform the door and/or break the window. Those loads may be from closing or slamming the door or may be from vibrational stresses experienced during operation of the machine or vehicle.

U.S. Pat. No. 5,095,659 ("Benoit") issued Mar. 17, 1992 is an example of prior art related to latch mechanisms. FIGS. 4-5 of Benoit discloses a hardware release module for a car door. The module has an exterior release mechanism attached to cables that transmit loads from the handle and lock cylinder to a latch mechanism. Benoit discloses a door with a door frame surrounding a glass window, where the window is a relatively small portion of the entire door area. The window is disposed in the upper portion of the door. The hardware release module is disposed in the remaining portion of the door. Thus, structural stresses applied to the car door of Benoit from the handle and lock cylinder have a relatively large door frame area over which the stresses may be absorbed and/or dissipated. Disadvantageously, the door of Benoit is not beneficial for use on machines and industrial vehicles because the relatively small window size inhibits the visibility desired by machine and industrial vehicle operators.

SUMMARY OF THE DISCLOSURE

In accordance with one aspect of the disclosure, a latch load distribution system is disclosed. The latch load distribution system may comprise a window, a door, a latch bracket and a door handle. The door may include a window and a door frame surrounding the window. The door frame may include an inner panel and an outer panel joined to the inner panel. The outer panel may define a cavity having an inner sidewall and a mouth with a mount width. The latch bracket may have a latch bracket length, a primary end and a secondary end. The primary end may be disposed in the cavity and may be coupled to the outer panel. The door handle may be coupled to the door frame and the latch bracket. In an embodiment, the latch bracket length may be longer than the mount width.

In accordance with another aspect of the disclosure, a door coupled to a cab frame of a vehicle is disclosed. The door may comprise a window having a visual surface area, a door frame surrounding the window and including a stamped inner panel and a stamped outer panel joined to the inner panel, a latch, a latch bracket coupled to the latch and extending from the latch to the inner and outer panels, and a door handle coupled to the door frame and to the latch bracket. The window may have a visual surface area in the range of about 65% to about 95% of the area of the door.

In accordance with a further aspect of the disclosure, a method of assembling a latch load distribution system for a vehicle is disclosed. The method may comprise positioning a primary end of a latch bracket in a cavity defined by an outer panel of a door frame, securing the latch bracket to the outer panel, joining the outer panel to an inner panel of the door frame and coupling a window to the door frame. The latch bracket may be suspended in a direction across the window.

DETAILED DESCRIPTION

Figure 1:
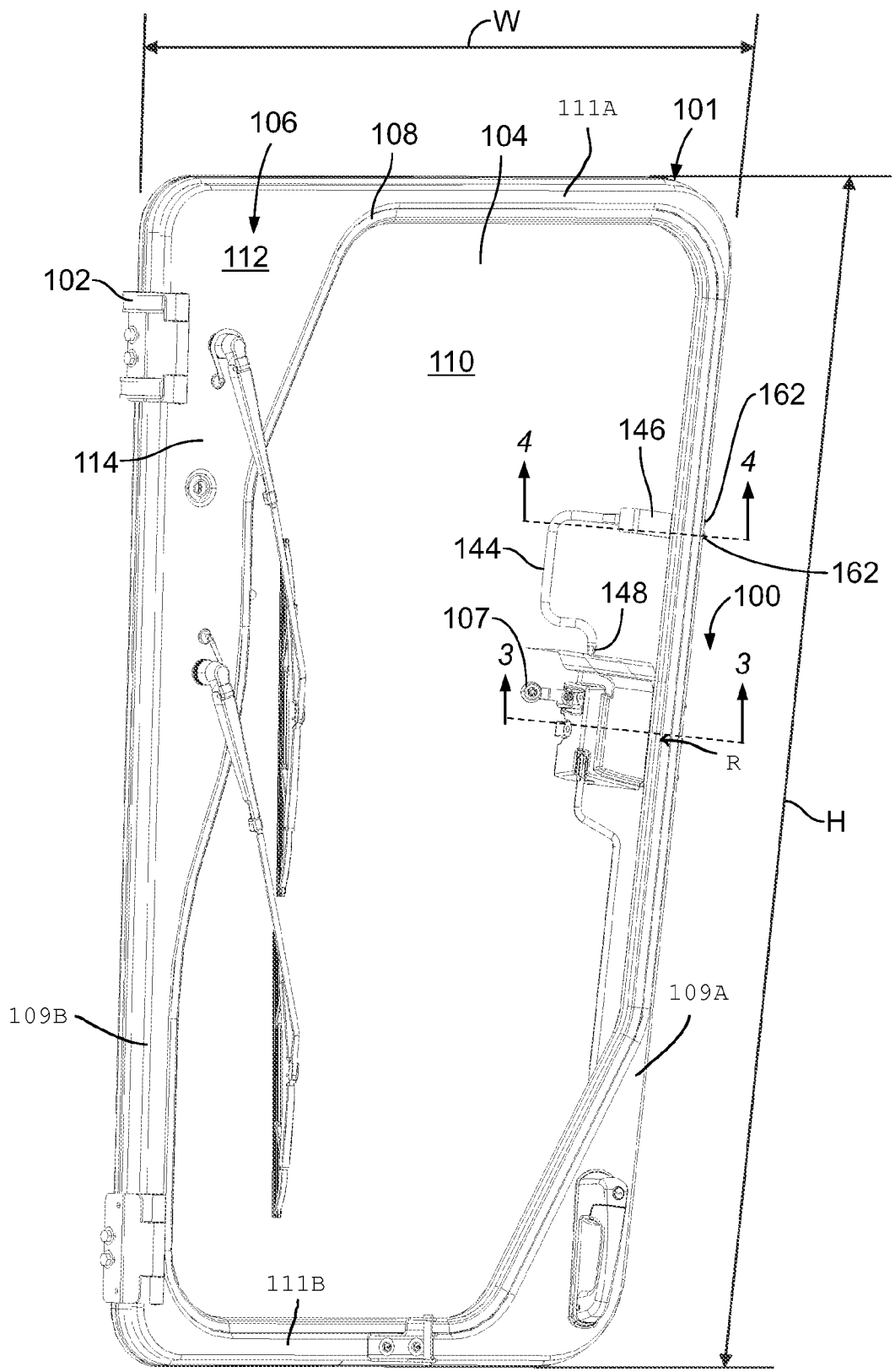
FIG. 1 is a perspective view of the front of one embodiment of a latch load distribution system constructed in accordance with the teachings of this disclosure.
Figure 2:
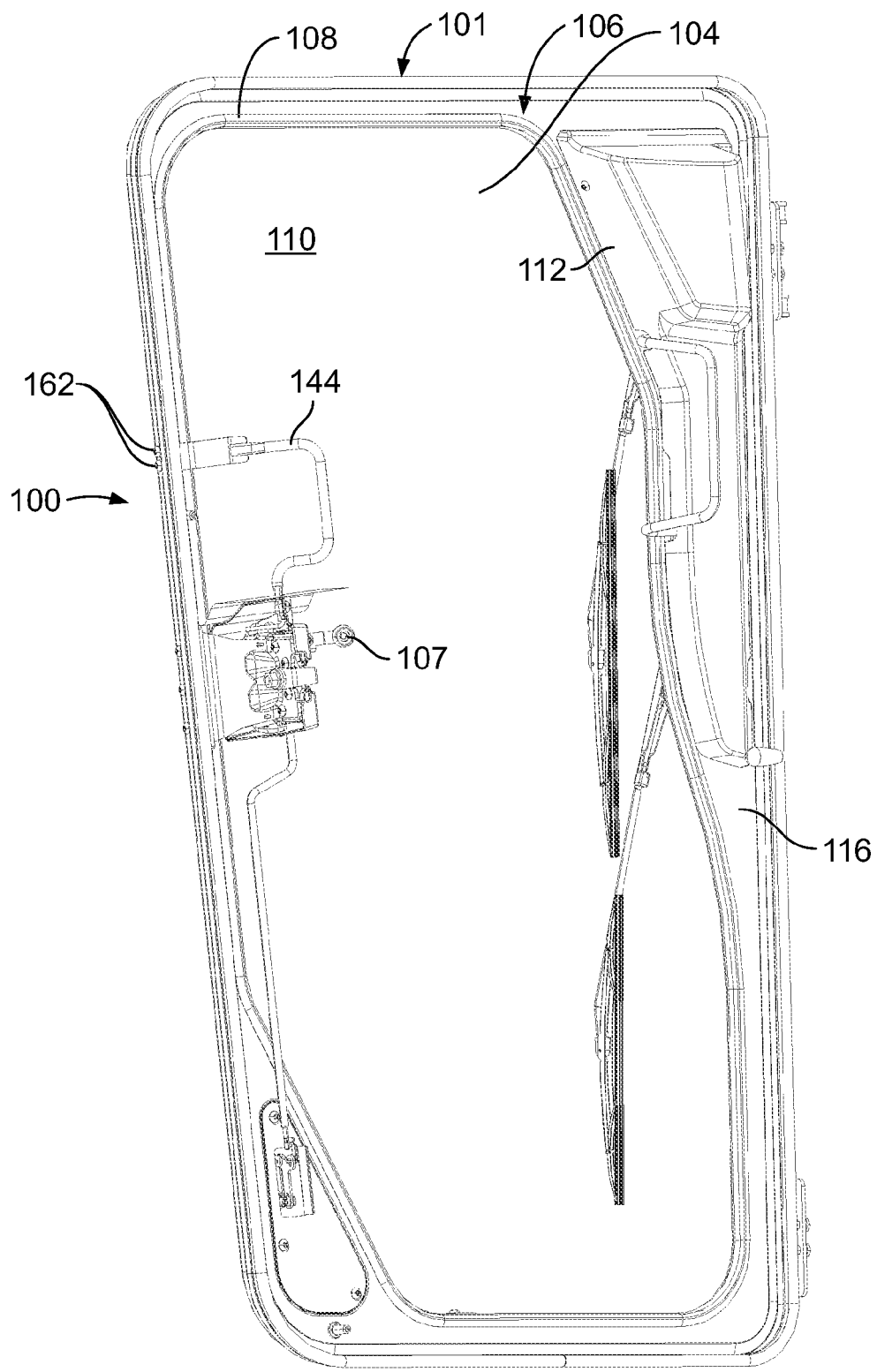
FIG. 2 is a perspective view of the back of the latch load distribution system of FIG. 1.

Referring now to the drawings, and with specific reference to FIGS. 1-2, there are shown perspective views of one embodiment of an exemplary latch load distribution system constructed in accordance with the present disclosure and generally referred to by reference numeral 100. FIG. 1 illustrates a view of the front side of the latch load distribution system 100 and FIG. 2 illustrates the back side of the latch load distribution system 100. While the following detailed description and drawings are made with reference to a latch load distribution system 100 mounted to a cab frame of a motor grader, the teachings of this disclosure may be employed on other earth moving, construction, material handling or mining vehicles in which a latch load distribution system is coupled to the cab frame of such vehicles.

Figure 5:
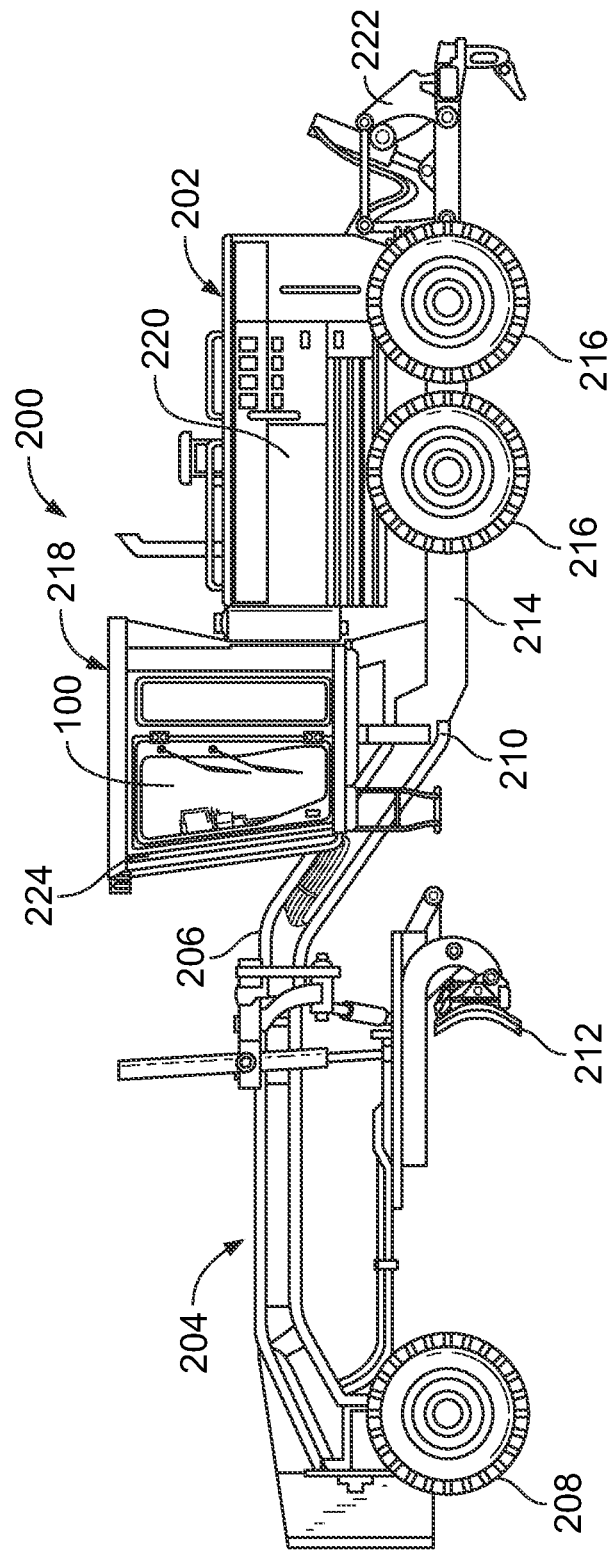
FIG. 5 is a perspective view of a vehicle that incorporates the features of the present disclosure.

FIG. 5 illustrates one example of a vehicle 200 that incorporates the features of the present disclosure. The vehicle in FIG. 5 is a motor grader, although the disclosure is not limited to doors for motor graders. The vehicle 200 includes a rear portion 202 and a front portion 204. The front portion 204 includes a front frame section 206, front ground engaging members 208, an articulated joint 210, and a first implement assembly 212, such as a blade or other appropriate attachment, mounted along the front frame section 206. The front frame section 206 may extend between the articulated joint 210 and the front ground engaging members 208. In some alternative embodiments, the frame 206, 214 may be a single frame piece.

The rear portion 202 includes a rear frame section 214, rear ground engaging members 216, an operator cab assembly 218, an engine 220 and drive train components (not shown). Although the rear ground engaging members 216 may be coupled directly to the rear frame section 214, in the embodiment illustrated in FIG. 5, the rear ground engaging members 216 are rotatably mounted on tandem supports that are pivotably mounted along either side of the rear frame section 214 at pivot shafts. The rear portion 202 may additionally include a second implement assembly 222, such as a ripper assembly, mounted to the rear frame section 214 by an appropriate structure. The cab assembly 218 may include a cab frame 224 and a latch load distribution system 100 coupled to the cab frame 224 by one or more hinges 102 (see FIG. 1) or the like. The cab assembly 218 (FIG. 5) may also include a seat, a steering apparatus, a speed control apparatus and a console (each not shown).

In the embodiment illustrated in FIG. 5, a pair of front ground engaging members 208 are spaced from a plurality of rear ground engaging members 216 which are disposed as pairs along opposite sides of the rear frame section 214. While in the embodiment illustrated in FIG. 5, the ground engaging members 208, 216 are wheels, in other embodiments, the ground engaging members 208, 216 may be track assemblies, or the like. Further, in other embodiments, alternate arrangements of ground engaging members 208, 216 may be utilized. For example, a pair of front wheels and a single pair of rear wheels.

Turning now to FIGS. 1-2, the latch load distribution system 100 may comprise a door 101, a latch 103 (see FIG. 3), a latch bracket 105, and a door handle 144 (FIGS. 1-2). A latch release 107 may be coupled to the latch 103. The strike plate (not shown) of the cab frame 224 (FIG. 5) may receive the latch 103 (FIG. 3) when the door 101 (FIG. 5) is closed. The door 101 (FIGS. 1-2) may include a window 104, a door frame 106 surrounding, or framing, the window 104, and a window gasket 108 that couples the window 104 to the door frame 106. The window 104 may be made of a transparent or translucent material. A portion of the edges of the window 104 may be covered by the window gasket 108. As shown in FIG. 1, the door frame 106 is defined by a pair of upright portions 109A, 109B interconnected by an upper lateral portion 111A and a lower lateral portion 111B. The upright portion 109A includes an intermediate region R where the latch 103 can be located.

The area of the window 104 (herein referred to as the "visual surface area" 110 of the window 104) may be about 65% to about 95% of the area of the door 101 (herein referred to as "door area" 112). In some embodiments, the visual surface 110 area may be about 70% to about 90% of the door area 112. In other embodiments, the visual surface area 110 may be about 80% of the door area 112, plus or minus about ten percent. The door area 112 is calculated utilizing the perimeter measurements of the door 101, as is know how to do in the art. The visual surface area 110 is calculated using the perimeter measurements of the window 104 when installed in the door 101. Any portion of the window 104 that is not visible (for example, covered by the window gasket 108) once installed in the door 101, is excluded from the area calculation for the visual surface area 110 of the window 104.

The door 101 may have a wide range of measurements. For example, the height, H, of the door 101 may be in the range of about 1 meter to about 2 meters and the width, W, of the door, at its widest point, may be in the range of about 0.5 meters to about 1.5 meters.

Figure 3:
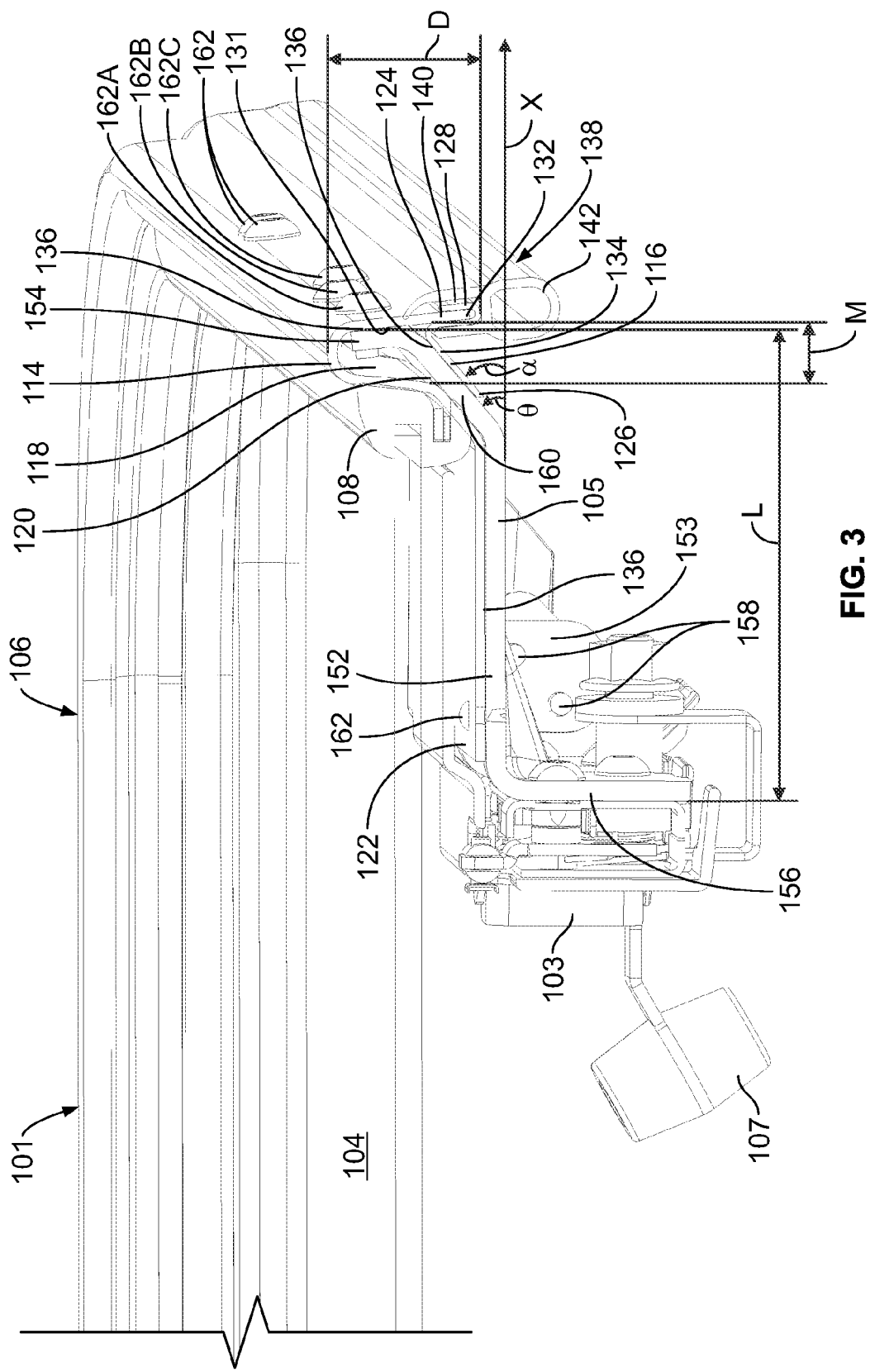
FIG. 3 is a cross-sectional view of the door of FIG. 1 along lines 3-3.

As illustrated in FIG. 3, the door frame 106 may include an outer panel 114 and an inner panel 116 joined to the outer panel 114. The outer panel 114 may surround the window 104 and may define a cavity 118 having a draw depth D and a mouth 120. The outer panel 114 may extend above the gasket 108 in a direction generally perpendicular to the plane of the window such that a stepped configuration may be generally formed with the gasket 108. The outer panel 114 may have an inner end 122 and an outer end 124.

The width of the mouth 120, herein referred to as the "mount width", M, may be relatively narrow in some portions of the door frame 106 such as, for example, the vicinity in which the latch bracket 105 is mounted to the outer panel 114. In one embodiment, the mount width, M, may be in the range of about 20 mm to about 75 mm, plus or minus ten percent. In another embodiment, the mount width may be in the range of about 30 mm to about 65 mm. In yet another embodiment the mount width may be about 34 mm plus or minus ten percent. The mount width M may be measured as the distance across the mouth of the cavity formed by the draw depth of the outer panel The draw depth D increases the structural integrity of the door frame 106 when subjected to stresses such as, for example, those generated when the door is slammed shut. In one embodiment, the draw depth D may range from about 20 mm to about 150 mm on some portions of the door frame 106, plus or minus ten percent. In another embodiment, the draw depth D may range from about 25 mm to about 75 mm on some portions of the frame 106, plus or minus ten percent. In yet another embodiment, the draw depth D may be about 40 mm on some portions of the frame 106, plus or minus ten percent. In one embodiment, the draw depth D may be greater than the mount width M. On some portions of the door frame 106, but not necessarily all portions, the draw depth D, in some embodiments, may range from about the mount width M to about twice the mount width M.

The inner panel 116 may have a first end 126 and a second end 128. The inner panel 116 may be joined to the outer panel 114 at an outer coupling 132 disposed at the second end 128 of the inner panel 116. The outer coupling 132 may be disposed proximal to the exterior 166 of the door 100 and may be generally disposed below the plane of the window 104. The outer coupling 132 may, in some embodiments, be a hem construction where the inner panel 116 is wrapped around the outer end 124 of the outer panel 114.

The inner panel 116 may include taper 134 disposed in the cavity 118 (of the outer panel 114) at an angle α from an axis X that is generally parallel to the plane of the window 104. The taper 134 increases the structural rigidity of the inner panel 116 when joined to the outer panel 114. In some embodiments, the angle α may be in the range of about 10° to about 45°, plus or minus ten percent. The outer panel 114 and the inner panel 116 may be stamped metal.

The latch load distribution system 100 may also include an adhesive 136 disposed between the outer panel 114 and the inner panel 116. In one embodiment, the adhesive 136 is disposed between the outer panel 114 and the inner panel 116 near the outer coupling 132 disposed at the second end 128 of the inner panel 116.

The door 101 may also include a door seal 138 surrounding the door frame 106. The door seal 138 may have a pocket 140 and a flexible sealing portion 142. The outer coupling 132 of the door frame 106 may be disposed in a nesting arrangement in the pocket 140 of the door seal 138. When the door 101 is coupled to the cab frame 224 and the door 101 is shut, the door seal 138 may be in sealing engagement with the cab frame 224 (FIG. 5) against which it is received. The door 101 may be pivotably coupled to the cab frame 224 by hinges 102 (FIG. 3), or the like, mounted to the door frame 106 and the cab frame 224.

The latch bracket 105 may include a primary end 154 a secondary end 156 and a body 152. In one embodiment, the bracket may also include a wing 153 that extends from the body 152. In the exemplary bracket shown in FIG. 3, the wing 153 is generally perpendicular to the body 152. In some embodiments, the latch bracket 105 may be one-piece part made of high strength steel. In other embodiments, the latch bracket 105 may be several components fixedly joined together. The primary end 154 may be disposed in the cavity 118 and may be coupled to an inner sidewall 131 of the outer panel 114. In some embodiments, the primary end 154 may be generally flattened against the inner sidewall 131 of the cavity 118.

The latch bracket 105 may be coupled to the door handle 144. In some embodiments, the latch bracket 105, or more specifically, the wing 153 may be coupled to the door handle 144 by one or more bolts 158, or the like. The latch bracket 105 may have a latch bracket length L. In some embodiments, the latch bracket length, L, may be longer than the mount width M.

A portion of the outer panel 114 may be nested with a portion of the latch bracket 105. An adhesive 136 may be disposed between the latch bracket 105 and the outer panel 114 and between the latch bracket 105 and the inner panel 116. In one embodiment, adhesive 136 may be disposed between the nested portions of the outer panel 114 and the latch bracket 105 and between the latch bracket 105 and the inner sidewall 131 of the outer panel 114. The latch bracket 105, when coupled to the outer panel 114 may be suspended across the window 104. In some embodiments, the nested portion of the outer panel 114 may also be suspended across the window 104.

The latch bracket 105 may include a latch taper 160 disposed in the cavity 118 of the outer panel 114. The latch taper may be disposed at an angle θ from a window axis W generally parallel to the plane of the window. In some embodiments, the angle θ may be in the range of about 10° to about 45°, plus or minus 10 percent.

The primary end 154 of the latch bracket 105 may be coupled to the outer panel 114 by one or more attachment members 162, such as a bolt, or the like. In one exemplary embodiment, three attachment members 162(a-c) may be used to couple the primary end 154 of the latch bracket 105 to the outer panel 114. In the exemplary embodiment discussed immediately above, the attachment members 162(a-c) may be, but do not have to be, disposed with the middle attachment member 162b positioned either above or below the other attachment members 162a and 162c. For example, in the embodiment illustrated in FIG. 3, the middle attachment member 162b may be in the range of about 1 mm to about 3 mm above attachment members 162a and 162c.

The body 152 of the latch bracket 105 of the latch bracket 105 may also be coupled to the outer panel 114 by one or more attachment members 162, for example, bolts or the like. In one embodiment, a pair of attachment members may be used to couple the body 152 of the latch bracket 105 to the outer panel 114.

Figure 4:
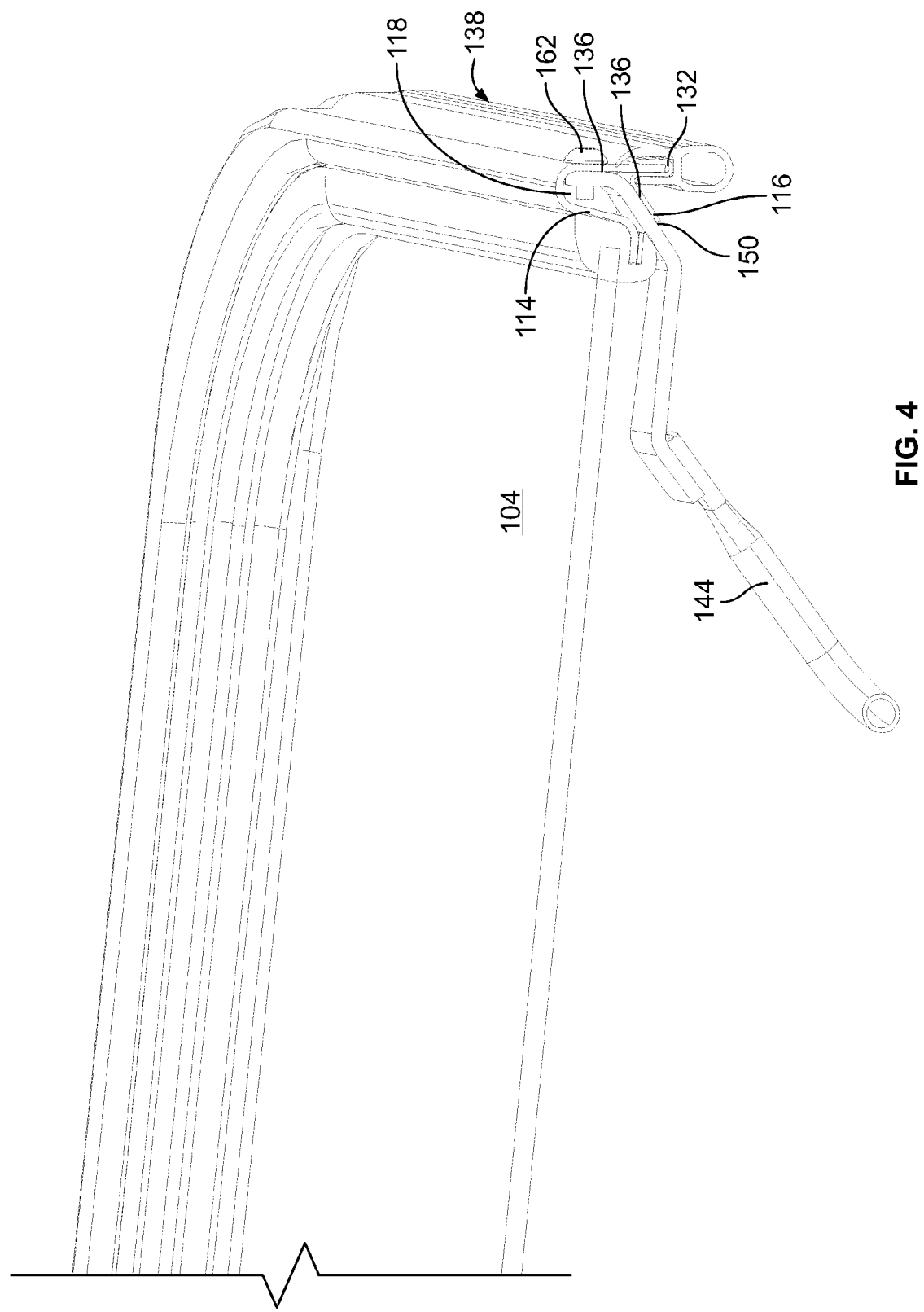
FIG. 4 is a cross-sectional front view of the door of FIG. 1 along lines 4-4.

The door handle 144 may have an upper door handle end 146 and a lower door handle end 148. The upper end 146 of the door handle 144 may be coupled to the outer panel 114. As best seen in FIG. 4, the upper end 146 of the door handle 144 may extend through an aperture 150 in the inner panel 116 into the cavity 118 of the outer panel 114. In one embodiment, the upper end 146 of the door handle 144 may be secured to the outer panel 114 by one or more attachment members 162, for example by bolts, or the like. In one embodiment, a pair of attachment members may be used as best seen on FIGS. 1-2. In other embodiments, other types of securing structure, as is known in the art, may be used to join the upper end 146 of the door handle 144 to the outer panel 114. In some embodiments, the lower end 148 of the door handle 144 may be coupled to the latch bracket 105 (FIG. 3) that is mounted on the outer panel 114.

Also disclosed is assembling a latch load distribution system 100 for a vehicle 200. The method comprises positioning a primary end 154 of a latch bracket 105 in a cavity 118 defined by an outer panel 114 of a door frame 106, securing, with adhesive 136, the latch bracket 105 to the outer panel 114, joining the outer panel 114 to an inner panel 116 of the door frame 106, and coupling a window 104 to the door frame 106, wherein the latch bracket 105 is suspended in a direction across the window 104.

INDUSTRIAL APPLICABILITY

The present disclosure may find applicability in providing a latch load distribution system that can provide the structural integrity needed to absorb and to dissipate forces on the latch load distribution system. Those forces may be from closing or slamming the door or may be vibrational stresses experienced during operation of the machine or vehicle. The loads may be high enough to deform the door and damage the latch, without the load distribution provided by the novel latch load distribution system. The features disclosed herein may be particularly beneficial to motor graders, wheel loaders and other earth moving, construction, mining or material handling vehicles that doors with relatively large window area and relatively small mount area on which a latch bracket and latch may be secured to the door. Loads acting on the latch bracket are distributed vertically along the door frame through the door handle of the latch load distribution system. The upper end of the door handle is disposed higher on the door frame than the latch bracket and transmits forces received by the latch bracket to the door frame in the area of the upper end of the door handle. In addition, the coupling arrangement of the bracket, outer panel and the handle (the bracket 105 coupled to the outer panel 114, the outer panel 114 coupled to the handle 144, and the handle 144 coupled to the bracket 105) in a general triangular configuration provides increased stress resistance to the forces that act upon the door.

What is claimed is:

1. A latch load distribution system comprising:
    a door including a window having a visual surface area, and a door frame surrounding the window and including an inner panel and an outer panel joined to the inner panel, the door frame having an upright portion with an intermediate region including a latch to be received by a striker plate when the door is in a closed position, the outer panel defining a cavity having an inner sidewall and a mouth with a mount width;
    a latch bracket having a latch bracket length, and including a primary end, a secondary end and a body, the primary end disposed in the cavity and coupled to the inner sidewall of the cavity of the outer panel at the intermediate region of the upright portion, a portion of the latch bracket spaced apart from and overlapping the visual surface area of the window in a direction normal to the plane of the window; and
    a door handle coupled to the intermediate region of the upright portion of the door frame and the latch bracket, wherein the latch bracket length is longer than the mount width, wherein in response to the door closing to the closed position loads acting on the latch bracket are distributed vertically along the upright portion of the door frame through the door handle, wherein further the visual surface area of the window is disposed to extend vertically below and above the latch bracket.

2. The system of claim 1, further including an adhesive disposed between the latch bracket and the outer panel and between the latch bracket and the inner panel.

3. The system of claim 1, in which the latch bracket further includes a wing extending from the body, wherein the wing is coupled to the door handle.

4. The system of claim 1, in which the latch bracket includes a latch taper disposed in the cavity of the outer panel, the latch taper disposed at an angle from an axis generally parallel to the window.

5. The system of claim 1, wherein the primary end of the latch bracket is generally flattened against the inner sidewall of the cavity.

6. The system of claim 1, wherein the latch bracket is a one-piece part.

7. The system of claim 1, wherein the inner panel and the outer panel are stamped metal, and the inner panel being joined to the outer panel at an outer coupling formed by a hem construction.

8. The system of claim 1, wherein the primary end of the latch bracket is coupled to the outer panel by a plurality of attachment members.

9. The system of claim 1, wherein the mount width is in the range of about 20 millimeters to about 75 millimeters.

10. The system of claim 1, in which the door has a door area and the window has a visual surface area in the range of about 65% to about 95% of the door area.

11. The system of claim 1, wherein the door has a door area and the window has a visual surface area in the range of about 75% to about 85% of the door area.

12. A door coupled to the cab frame of a vehicle, the door comprising:
 a window having a visual surface area;
 a door frame surrounding the window and including a stamped inner panel and a stamped outer panel joined to the inner panel, the door frame having an upright portion with an intermediate region;
 a latch disposed at the intermediate region to be received by a striker plate when the door is in a closed position;
 a latch bracket coupled to the latch and extending from the latch to the inner and outer panels, the latch bracket having a primary end coupled to an inner sidewall of a cavity defined by the outer panel at the intermediate region of the upright portion, a portion of the latch bracket spaced apart from and overlapping the visual surface area of the window in a direction normal to the plane of the window, the visual surface area of the window disposed to extend vertically below and above the latch bracket; and
 a door handle coupled to the intermediate region of the upright portion of the door frame and to the latch bracket, wherein in response to the door closing to the closed position loads acting on the latch bracket are distributed vertically along the upright portion of the door frame through the door handle,
 wherein the window has a visual surface area in the range of about 65% to about 95% of the area of the door.

13. The door of claim 12, wherein the cavity has a draw depth, and a mouth with a mount width in the range of about 20 millimeters to about 75 millimeters.

14. The door of claim 13, in which the latch bracket includes a latch taper disposed in the cavity of the outer panel, the latch taper disposed at a latch angle from an axis generally parallel to the window.

15. The door of claim 14, wherein the latch angle is in the range of about 10° to about 45°.

16. The door of claim 12, wherein the primary end of the latch bracket is coupled to the outer panel by an attachment member, wherein the door handle has a lower end coupled to the latch bracket and an upper end coupled to the intermediate region of the upright portion of the door frame, the upper end extending through an aperture formed in the inner panel into the cavity of the outer panel, wherein the upper end of the door handle is disposed higher on the door frame than the latch bracket to transmit forces received by the latch bracket to the door frame in an area of the upper end of the door handle.

17. The door of claim 12, wherein the vehicle is a motor grader.

18. The system of claim 1, wherein the door handle has a lower end coupled to the latch bracket and an upper end coupled to the intermediate region of the upright portion of the door frame, the upper end extending through an aperture formed in the inner panel into the cavity of the outer panel.

19. The system of claim 18, wherein the upper end of the door handle is disposed higher on the door frame than the latch bracket to transmit forces received by the latch bracket to the door frame in an area of the upper end of the door handle.

* * * * *